Oct. 15, 1968

J. ROSA 3,406,325

FORCED COMMUTATING INVERTER

Filed Jan. 13, 1966

WITNESSES:
Bernard R. Gregory
James F. Young

INVENTOR
John Rosa
BY John L. Houghton
ATTORNEY

United States Patent Office 3,406,325
Patented Oct. 15, 1968

3,406,325
FORCED COMMUTATING INVERTER
John Rosa, Pittsburgh, Pa., assignor to Westinghouse Electric Corporation, Pittsburgh, Pa., a corporation of Pennsylvania
Filed Jan. 13, 1966, Ser. No. 520,497
11 Claims. (Cl. 321—5)

ABSTRACT OF THE DISCLOSURE

A commutating circuit for an inverter using discontinuous control type valves, such as thyristors, in which two commutating capacitors, connected in series between the source terminals, are alternately charged and thereafter discharged through first and second reactors to reduce the current flow through certain conducting ones of the control valves below the sustaining current and for an interval sufficient to commutate them.

---

This invention relates generally to inverters using valves of the discontinuous control type and is more particularly related to means for commutating the current flow through the discontinuous type control valves.

An object of this invention is to provide a new and improved circuit to force the commutation of inverters using thyristors.

Another object of this invention is to provide a pair of alternately chargeable storage devices for forced commutating the sets of thyristors.

Other objects will be apparent from the specification, the appended claims and the drawings, in which drawings:

Figure 1:
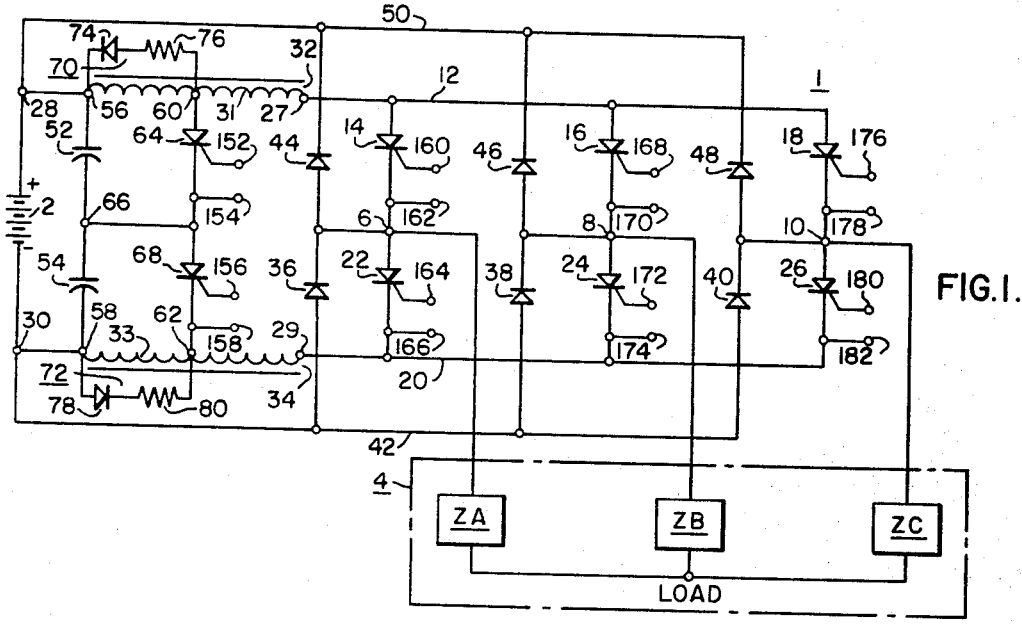
FIGURE 1 is a schematic diagram of a separately excited force commutated inverter embodying the invention.

Referring to the drawings by characters of reference, the numeral 1 indicates generally a forced commutated power inverter energized from a suitable source of direct current energy diagrammatically indicated as battery 2 for supplying a polyphase alternating voltage to a three phase load 4 comprising the elements ZA, ZB and ZC.

The inverter 1 comprises a plurality of output terminals 6, 8 and 10 which are connected to a positive bus 12 by means of thyristors 14, 16 and 18 and to a negative bus 20 by means of thyristors 22, 24 and 26. The thyristors 14, 16 and 18 are polarized to conduct current from the positive bus 12 to the output terminals 6, 8 and 10, respectively, while the thyristors 22, 24 and 26 are polarized to conduct current from the output terminals 6, 8 and 10, respectively, to the negative bus 20.

The buses 12 and 20 are connected to end terminals 27 and 29 of the windings 31 and 33 of reactors 32 and 34, respectively. The other end terminals 56 and 58 of the windings 31 and 33 are connected to the positive and negative potential input terminals 28 and 30.

Diodes 36, 38 and 40, respectively, connect a reactive current conducting bus 42 to the output terminals 6, 8 and 10, respectively. Diodes 44, 46 and 48, respectively, connect the output terminals 6, 8 and 10 to a second reactive current conducting bus 50.

A pair of capacitors 52 and 54 is connected in series between the end terminals 56 and 58 and are provided with a common connection 66. The connection 66 is connected to each intermediate terminal 60 and 62 of the reactors 32 and 34. Preferably, these treminals 60 and 62 are at the center of the windings 31 and 33 for purposes which will be brought out more fully below. The connection to the tap or terminal 60 includes a thyristor 64 and, when conductive, permits the capacitor 52 to discharge through the left-hand portion of the winding 31. Similarly, the connection to the tap or terminal 62 includes a thyristor 68 to permit the capacitor 54 to discharge through the left-hand portion of the winding 33 of reactor 34.

Unidirectional current flow energy absorbing networks 70 and 72 are connected between the terminals 56–60 and 58–62 of the reactors 32 and 34, respectviely. Each of the unidirectional networks comprises in series a diode and a resistor 74–76 and 78–80, respectively. The reactive current conducting buses 42 and 50 are shown as being connected respectively to the input terminals 30 and 28. However, they may be connected directly to the reactor terminals 62 and 60 respectively, if desired, and still be within the confines of this invention.

Timing pulses for selectively rendering the thyristors 14–18 and 22–26 conductive at the proper intervals may be obtained in any suitable manner. The blocks designated by reference characters bearing like numerals to the thyristor but with the suffix A added thereto relate the timing pulses to the controlled thyristors.

Figure 4:
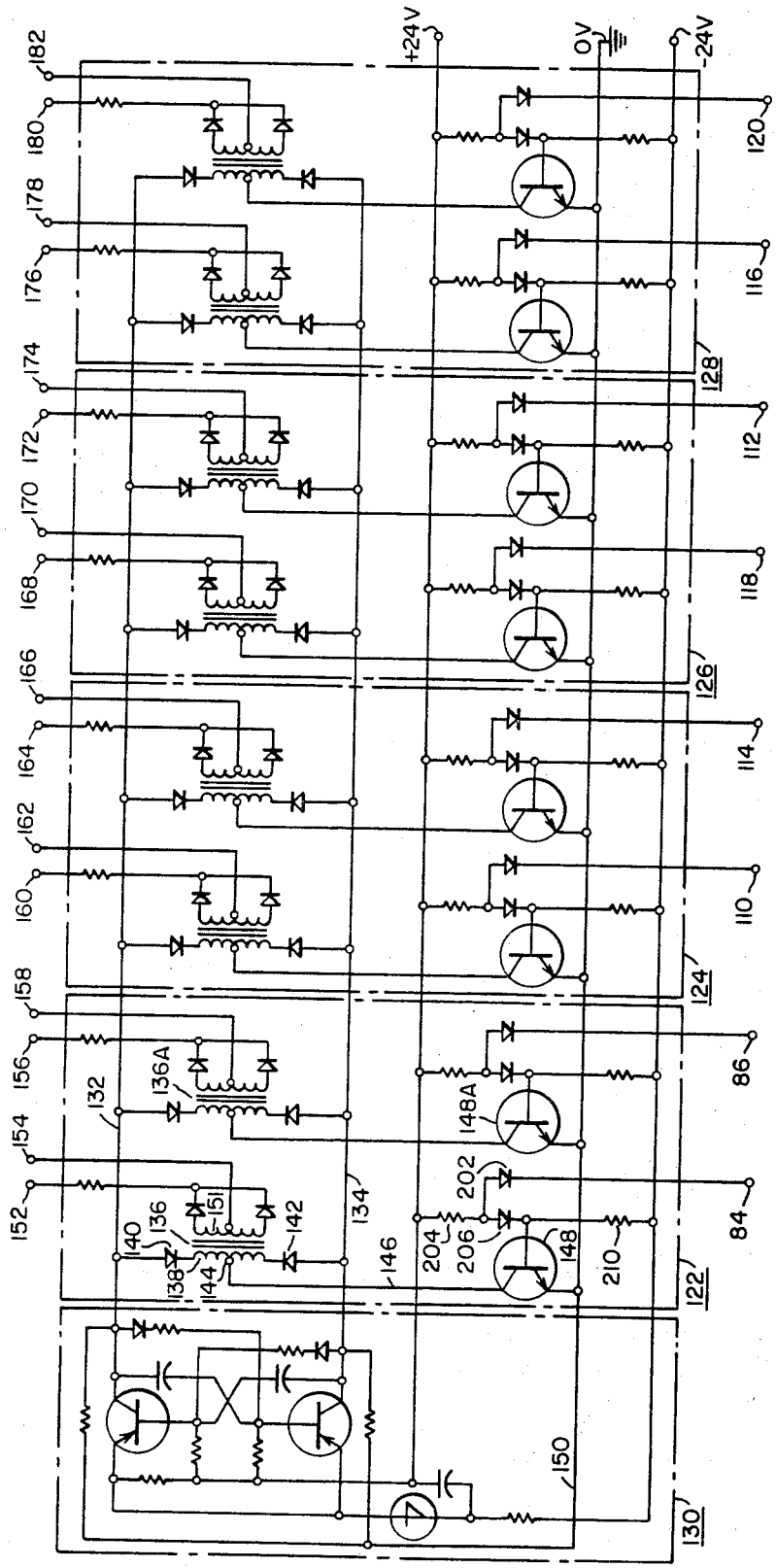
FIG. 4 schematically shows one apparatus which may be used to generate the gate signals for the thyristors of the inverter under control of the time pattern generated by the circuitry of FIG. 3.

The timing pulses are derived from an oscillator 82 which alternately momentarily reduces the output potential of a pair of output terminals 84 and 86. These terminals are normally maintained at +24 v. and are momentarily reduced to 0 v. to provide first and second series of alternately spaced signals at times as indicated by curves 64A and 68A. These same signals are also applied between a pair of buses 88 and 90 which are connected to and sequentially energize the flip-flops 92, 94 and 96 of a ring counter 97. The ring counter 97 includes buses 98, 100, 102, 104, 106 and 108 which interconnect the flip-flops 92, 94 and 96 so that solely one thereof is flipped for each of the output signals of the oscillator 82. The output terminals 110–120, respectively, are connected to the buses 98–108. The output terminals 84, 86, and 110–120 connect with like numbered treminals of FIGURE 4 and supply control potential to derive the output switches 122, 124, 126 and 128 in accordance with the time curves 64A, 68A, 14A, 22A, 16A, 24A, 18A and 26A. These switches 122–130 control the supply of high frequency energy from the oscillator 130 to the gate control of thyristors 64, 68, 14–18, and 22–26 of the inverter 1.

The oscillator 130 altrneately energizes a pair of positive potential buses 132 and 134 from a +24 v. terminal and thereby supplies the high frequency positive potential pulsations to all of the switches 122–128. Since all of the switches are the same only one thereof need be described in detail. Each of the switches includes a transformer 136 having the end terminals of its primary winding 138 connected to the buses 132 and 134 through diodes 140 and 142, respectively. The diodes are polarized to pass current to the winding 138 from the buses 132 and 134. The primary winding is provided with a center tap 144 connected to the 0 v. terminal through transistor 148 and bus 150 whereby the transformer 136 is energized solely when the control transistor 148 conducts. When the transformer 136 is energized by the alternate energization of the buses 132 and 134 through the opposite halves of the winding 138, the secondary winding 151 is energized with a high frequency alternating current. The winding 151 has its end terminals connected to one output terminal 152 through diodes 153 and has its center tap connected to the output terminal 154 whereby the output terminals are pulsatingly energized with direct voltage from the oscillator 130 when transistor 148 conducts. Each switch contains a second transformer 136A which, when energized, energizes output terminals 156 and 158 with high frequency direct voltage pulsations upon completion of the energizing circuit of the primary winding through the companion transistor 148A.

The switch 124 is provided with output terminals 160, 162, 164, 166, the switch 126 with output terminals 168, 170, 172 and 174 and the switch 128 with output terminals 176, 178, 180 and 182. The output terminals of the switches 122–128 are connected to like numbered control terminals of the thyristors 64, 68, 14, 22, 16, 24, 18 and 26 of the inverter 1 illustrated in FIG. 1.

The oscillator 82 comprises a unijunction transistor 184 which periodically conducts when a capacitor 186 receives a critical charge. The rate at which the capacitor 186 is charged is determined by an adjustable resistor 188. When the unijunction transistor 184 conducts it supplies a control pulse to and reverses the conductive condition of a pair of transistors 190–192 of a flip-flop network. This reversal of the conducting condition of the transistors 190 and 192 reverses the conductive condition of a pair of output transistors 194 and 196. During the time interval that the transistor 194 conducts, the output terminal 84 is maintained substantially at that of the zero or ground bus. When the transsitor 194 is blocked, the output potential of the terminal 84 is maintained substantially at $+24$ volts. The potential at the output terminal 86 is similarly controlled by the transistor 196.

Figure 3:
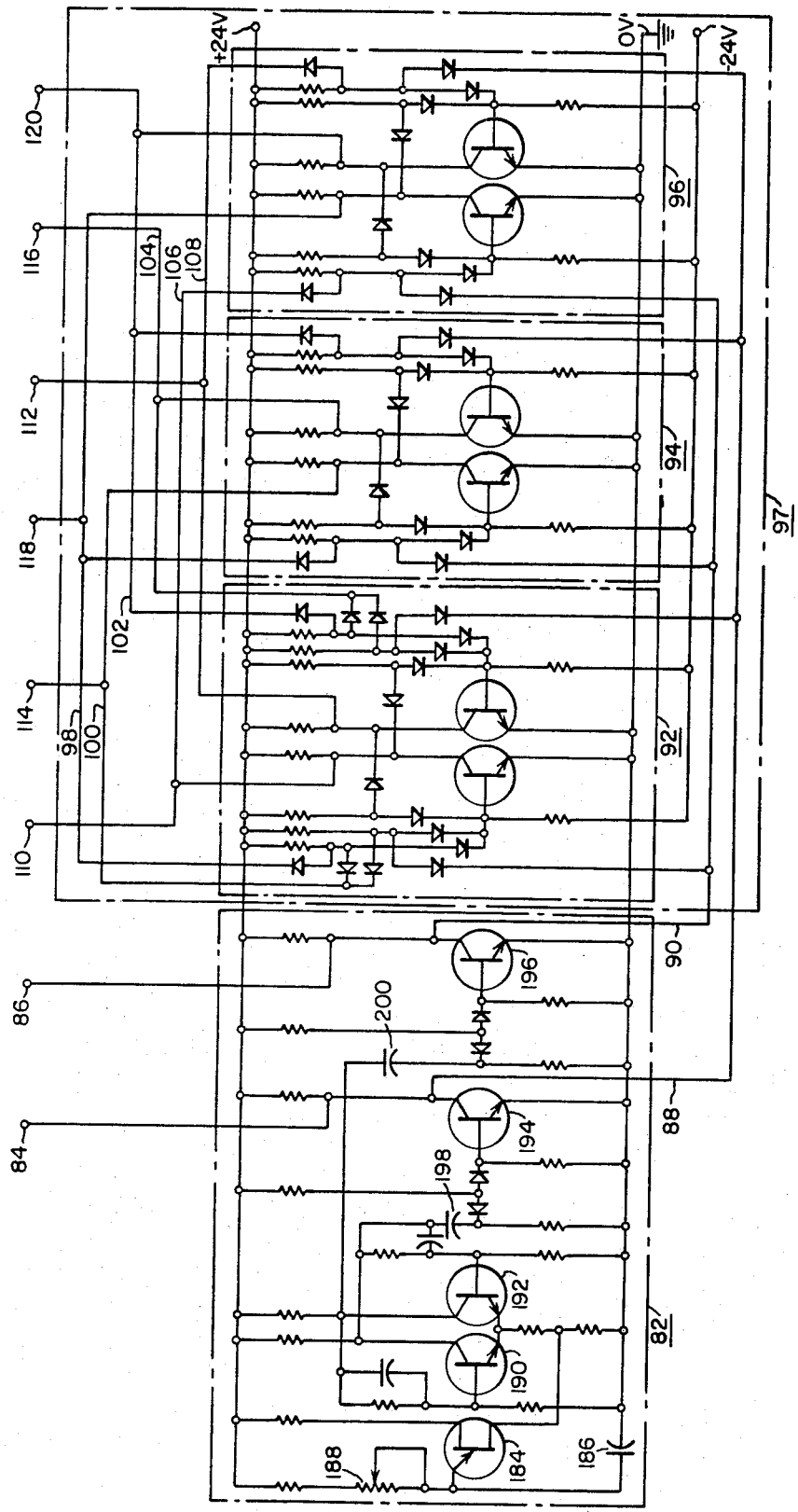
FIG. 3 illustrates one circuit which may be used for generating the time pattern required for the inverter.

It is believed that the remainder of the details of construction may best be understood by a description of the operation thereof which is as follows: upon energization of the terminals of the potential supplying buses identified in FIG. 3 as $+24$ v. and 0 v., the oscillator 82 oscillates and supplies output control signals to the output terminals 84 and 86 and ring counter actuating buses 88 and 90 at intervals as shown by the time curves 64A and 68A.

Figure 2:
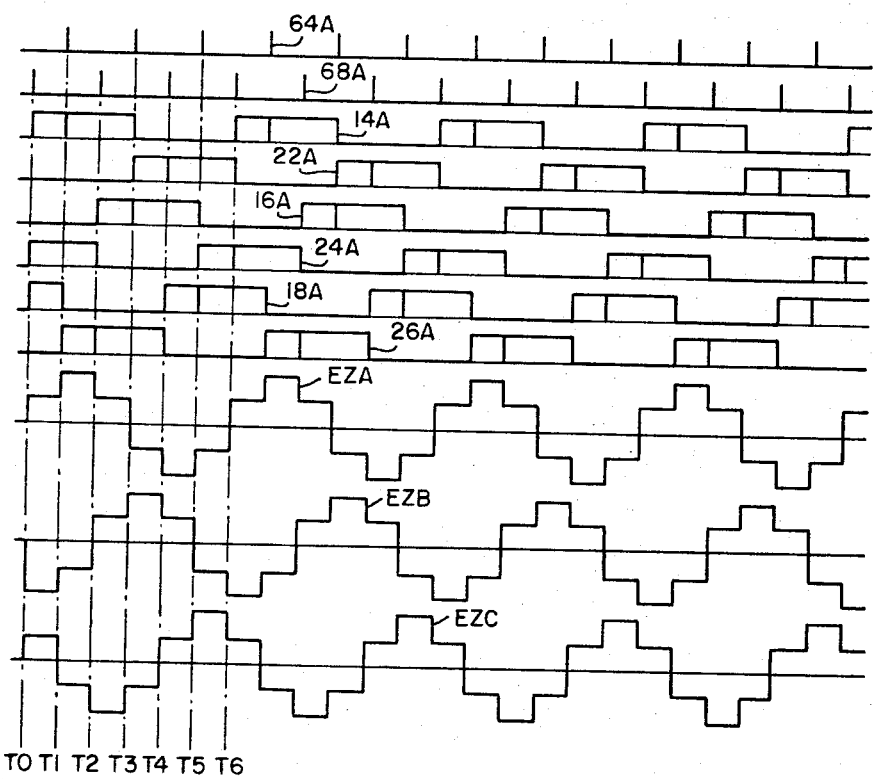
FIG. 2 is a curve sheet showing the relative conducting time of certain of the electric valves of the inverter and the driving mechanism therefor.

The signals supplied to the buses 88 and 90 sequence the ring counter whereby the output terminals 110–120 are energized in the time sequence as shown by the time curves 14A–22A–16A–24A–18A–26A of FIG. 2. The terminals 84–86 and buses 88 and 90 are merely momentarily deenergized upon a charge in conductive condition of the flip-flop transistors 190 and 192. This is due to the presence of capacitors 198 and 200 in the base drive circuit which interconnects the flip-flop transistors 190 and 192 with the normally conducting output transistors 194 and 196.

The output signals at the terminals 84 and 86 drive the transistors 148 and 148A of the output switch 122. During the time that transistor 194 is momentarily blocked, the output signal supplied to the terminal 84 blocks current flow through the diode 202 and reduces current flow through the resistor 204 sufficiently to cause base drive current to flow from the $+24$ v. terminal through resistor 204, diode 206, base-emitter of the transistor 148 to the 0 v. terminal through bus 150. The transistor 148 conducts collector-emitter and completes the energizing circuit of the primary winding 138 of the transformer 136. This causes current flow from the buses 132 and 134 through opposite primary winding portions to energize the transistor 136 at a high frequency rate of the oscillator 130. Upon termination of the output signal to the terminal 84, this terminal 84 is effectively connected to the 0 v. terminal bus through the now conducting transistor 194. This permits current to flow from the $+24$ volt bus through resistor 204, diode 202, transistor 194 to the 0 v. terminal. The increased voltage drop through the resistor 204 reduces the potential of the base of the transistor 148 sufficiently with respect to the potential of the emitter thereof so that the transistor 148 ceases conduction. A similar operation occurs when the output signal is applied to the terminal 86 to temporarily render the transistor 148A conducting to permit energization of the primary winding of the transformer 138A.

During the time that the transformer 136 is energized the center tap secondary winding thereof supplies rectified pulsating direct current pulses to the output terminals 152 and 154 in a plurality in which the terminal 152 is periodically rendered positive with respect to the output terminal 154. This energization is for the time period as indicated by the time curve 64A. These high frequency pulses are applied between the gate and cathode of the thyristor 64 whereby the thyristor 64 becomes conducting for the period of the signal. Similarly, a signal is supplied by the output terminals 156 and 158 between the gate and cathode of the thyristor 68 as indicated by the time curve 68A in FIG. 2. The output switches 124, 126 and 128 are similarly controlled by the flip-flops 92, 94 and 96 of the ring counter to provide high frequency gate signals at the output terminals 160–182 as indicated by the time curves 14A, 22A, 16A, 24A, 18A and 26A, respectively.

Upon connection of the source 2 to the power input terminals 28 and 30, each of the capacitors 52 and 54 will charge to one-half of the magnitude of the voltage of the source 2. Assuming a time $T_0$ (FIG. 2), a pulse is provided to render the thyristor 68 conducting to discharge the capacitor 54 through the left-hand half of the reactor 34 and to charge the capacitor 52 to substantially the full voltage of the source 2. The charge of the capacitor 52 may to some extent rise above that of the source 2 due to the free-wheeling effect by the reactor 34. The increase in potential above that of the source 2 is limited by the conduction of the energy absorbing network 72. This network 72 will conduct when the voltage at terminal 58 exceeds the voltage at terminal 62 by a small amount and prevents the ratcheting upward of the voltage across the capacitors 52 and 54 due to continued charging and discharging thereof as will be made clear below.

At time $T_0$, the thyristor 14 is rendered conducting by the pulse as indicated by the time curve 14A and this thyristor is maintained in a conducting condition until time $T_1$. Also at time $T_0$, a conducting pulse is applied to the thyristor 24 as indicated by the time curve 24A and this thyristor is maintained conducting until time $T_2$. Similarly, a conducting pulse is applied to the thyristor 18 as indicated by the time curve 18A and the thyristor 18 is maintained conductive until the time $T_1$.

During the time period $T_0$–$T_1$, power current flows from the terminal 28 through the winding of the reactor 32, the thyristors 14 and 18, the phase elements represented as ZA and ZC, the phase element ZB, the thyristor 24, the reactor 34 and the negative terminal 30 to the source 2. The resultant phase to neutral energization of the load is indicated by the curves EZA, EZB and EZC. As indicated by the time curve 68A, the signal to the thyristor 68 is of short duration (in the neighborhood of 25 microseconds) so that the thyristor 68 becomes non-conducting as soon as capacitor 54 discharges and capacitor 52 charges.

At the time $T_1$, the terminal 84 is pulsed as indicated by time curve 64A to supply a conducting pulse to the thyristor 64 for terminating the conducting period of the thyristors 14 and 18 (time curve 64A) and conducting pulses to render the thyristor 26 conducting and thyristor 14 reconducting as indicated by the time curves 26A and 14A.

Conduction of the thyristor 64 causes the capacitor 52 to discharge through the left-hand half of the winding of the reactor 32. This discharge of the capacitor 52 through the autotransformer-effect of the reactor 32 reduces the potential of the bus 12 with respect to that of the input terminal 28 by something more than twice the magnitude of the potential supplied by the source 2 whereby the anodes of the thyristors 14, 16 and 18 are reduced substantially below the potential of the negative bus 20. This, of course, causes the formerly conducting thyristors 14 and 18 to terminate their conduction for a period which exists as long as the anodes thereof are negative with respect to their cathodes. The magnitude of the capacitance of capacitor 52 is selected with respect to the other circuit components so that this reduced condition of the bus 12 will exist for a period sufficiently long to permit the thyristor 18 to reform and be in a condition to support potential thereacross. Since the output pulses will continually be supplied from the terminal 110 of the ring counter 97, the gate current through the thyristor 14 will be maintained and the thyristor 14 will again conduct as soon as its anode potential is raised above that of its cathode as indicated by the raised portion of the time curve 14A.

When the thyristor 64 conducted, it completed a charging circuit for the capacitor 54 which charges through a circuit which extends from the positive terminal 28 through the left-hand half of the winding of the reactor 32, thyristor 64, capacitor 54, terminal 58 and terminal 30 back to the negative terminal 30 of the supply. As soon as the capacitor 52 discharges it attempts to charge in the opposite direction due to the free-wheeling effect provided by the reactance of the reactor 32. This, however, is ineffective to raise the potential of the capacitor 54 more than slightly above that of the terminal 28 or to reverse charge the capacitor 32 to a great extent. This is due to the conduction of the energy absorbing network 70 which conducts through its diode 74 when the potential of the terminal 60 arises a predetermined magnitude above that of the terminal 56.

During the time interval that the bus 12 is lowered in potential due to the discharging of the capacitor 52 and the charging of the capacitor 54, load current will continue to flow through a path which extends from the load element ZB, output terminal 8, anode to cathode to the thyristor 24, bus 20, reactor 34, bus 42 and diodes 36 and 40 to output terminals 6 and 10 and therefrom through the load elements ZA and ZC back to the load element ZB.

At time $T_1$, the terminal 180 will become energized and the thyristor 26 will be rendered conducting whereby a portion of the current flowing through the load element ZA will return to the negative bus 20 through the thyristor 24 and load element ZC. The gate current to the thyristor 18 was interrupted at the time $T_1$. Gate current is never supplied to both of the thyristors of the sets 14–22; 16–24 and 18–24 at the same time so that the buses 12 and 20 are never connected except through the load 4. This condition is indicated by the potential curves EZA, EZB and EZC.

At time $T_2$ another pulse (time curve 68A) is provided which renders the thyristor 68 conducting to discharge the capacitor 54 through the left-hand half of the winding of the reactor 34 and charges the capacitor 52. This discharge and charging of the capacitors 54 and 52, respectively, raises the potential of the negative bus 20 with respect to the negative input terminal 30 by an amount which is somewhat twice that of the source 2 whereby the cathodes of the thyristors 22, 24 and 26 are elevated in potential above that of the anodes thereof and conduction through the conducting thyristors 24 and 26 is terminated. Also at the time $T_2$, the gate signal to the previously conducting thyristor 24 is removed as indicated by the curve 24A and that supplied to the thyristor 26 is continued as indicated by the curve 26A. This discharging of capacitor 54 and charging of the capacitor 52 is timed to maintain the reverse potential condition between the cathode and anode of the thyristor 24 for a time period suitable to permit the carriers on the thyristor 24 to reform whereby this thyristor will support voltage when it is reapplied thereacross.

Load current during this interval continues to flow from the bus 12 through thyristor 14, load element ZA and load elements ZB and ZC to the output terminals 8 and 10. Some current flows from the output terminal 8 through the diode 46 and some current flows from the output terminal 10 through the diode 48. Current from the diodes 46 and 48 flows through the bus 50 and reactor 32 back to the bus 12. Thus, load current flow through the load 4 is uninterrupted during the commutating period. Shortly after the time $T_2$, the capacitor 52 is recharged and the capacitor 54 is discharged and the potential of the bus 20 is decreased sufficiently to permit the thyristor 26 to again conduct current from the output terminal 10 to the negative bus 20. Conduction of the thyristor 16 is initiated (curve 16A) and it conducts current from the positive bus 12 to the output terminal 8. The load 4 will now be energized as indicated by the curves EZA, EZB and EZC.

The ring counter will continually be stepped by sequential ones of the pulses applied by the oscillator 82 (see time curves 64A and 68A) to sequentially energize the thyristors 14, 22, 16, 24, 18 and 26 as indicated by the curves 14A, 22A, 16A, 24A, 18A and 26A, respectively. The conducting thyristors are extinguished as desired by rendering thyristors 64 and 68 conducting at selected times. Thus, a three phase energization of the load 4 is provided as indicated by the voltage curves EZA, EZB and EZC.

While only a single embodiment of this invention is illustrated, it is intended to be illustrative rather than limitative. For example, the invention may be applied to shut off other types of discontinuous control valves whether in polyphase or single phase circuits. The limits of the invention are to be determined by the scope of the hereinafter appended claims.

What is claimed and is desired to be secured by United States Letters Patent is as follows:

1. In an inverter, a first pair of input terminals adapted to be energized from a source of unidirectional potential energy, a second pair of output terminals adapted to energize an alternating potential load, first and second discontinuous control type electric valves, each said valve having a power circuit and a control circuit, first and second reactors, first and second commutating capacitors, a first energy path connecting a first of said input terminals to a first of said output terminals and including said first reactor and said power circuit of said first valve, a second energy path connecting a second of said input terminals to a second of said output terminals and including said second reactor and said power circuit of said second valve, each said reactor being intermediate the said input terminal and the said power circuit with which it is associated, first and second unidirectional current flow devices, a third energy path connecting said second input terminal to said first output terminal and including said first unidirectional device, a fourth energy path connecting said first input terminal to said second output terminal and including said second unidirectional device, means connecting said capacitors in series circuit to provide a first end terminal adjacent said first capacitor and a second end terminal adjacent said second capacitor and a common terminal intermediate said capacitors, means connecting said first end terminal to said first energy path intermediate said first reactor and said first input terminal and said second end terminal to said second energy path intermediate said second reactor and said second input terminal, first and second unidirectional current flow controlling means, means connecting said first unidirectional means in shunt with at least a portion of said first reactor, means connecting said second unidirectional means in shunt with at least a portion of said second reactor, first and second switches, a first discharge circuit for said first capacitor and including said first switch and at least a portion of said first reactor, a second discharge circuit for said second capacitor and including said second switch and at least a portion of said second reactor, said discharge circuits being effective upon closure of their respective said switch to substantially completely discharge their respective said capacitor.

2. The combination of claim 1 in which each said unidirectional means includes energy absorbing means.

3. The combination of claim 1 in which said discharge circuits are effective upon closure of their respective said switch to substantially completely discharge their respective said capacitor and to charge the other one of said capacitors to substantially the supply potential to the inverter.

4. The combination of claim 2 in which each of said switches includes a control device for initiating conduction of energy therethrough, means connected between said control device of said second switch and said first capacitor and responsive to the presence of a predetermined magnitude of charge in said first capacitor to render said first switch conductive, and means connected between said control device of said first unidirectional means and said second capacitor and responsive to the presence of a predetermined magnitude of charge in said second capacitor to render said second switch conductive.

5. The combination of claim 2 in which each of said reactors is provided with a winding having end terminals and an intermediate terminal, a first of said end terminals of said first reactor being connected to said first input terminal and to said first end terminal of said capacitors, the second of said end terminals of said first reactor being connected to said first electric valve, said first switch being connected between said common terminal and said intermediate terminal of said first reactor, a first of said end terminals of said second reactor being connected to said second input terminal and to said second end terminal of said capacitors, the second of said end terminals of said second reactor being connected to said second electric valve, said second switch being connected between said common terminal and said intermediate terminal of said second reactor.

6. The combination of claim 5 in which said first unidirectional means is connected between said intermediate terminal and one of said end terminals of said first reactor and said second unidirectional means is connected between said intermediate terminal and one of said end terminals of said second reactor.

7. The combination of claim 4 in which said one terminal of said reactors are said first terminals of said reactors and said intermediate terminals are center tap terminals.

8. In an inverter, first and second input terminals adapted to be energized from a source of unidirectional potential energy, first and second and third output terminals adapted to be connected to a polyphase load, a plurality of discontinuous control type electric valves, each said valve having a power circuit and a control circuit, first and second reactors, each said reactor having a winding, first and second buses, means individually connecting said power circuits of first and second and third of said valves between said first bus and said first and second and third of said output terminals respectively, means individually connecting said power circuits of fourth and fifth and sixth of said valves between said second bus and said first and second and third of said output terminals respectively, all of said power circuits being connected to conduct current in a direction away from said first bus toward said second bus, said first bus being connected to said first input terminal through at least a portion of said winding of said first reactor and said second bus being connected to said second input terminal through at least a portion of said winding of said second reactor, first and second and third pairs of series connected unidirectional current flow devices, means connecting said pairs of series connected devices between said first and second buses and including at least a portion of each of said windings, said pairs of series connected devices being polarized for current in a direction from said second bus to said first bus, means individually connecting the common point of said first and second and third pairs of flow devices to said first and second and third output terminals respectively, first and second commutating capacitors, first and second switches, first and second unidirectional flow energy consuming circuits, a first capacitor discharge circuit connecting said first capacitor through said first switch across at least a portion of said winding of said first reactor, a second capacitor discharge circuit connecting said second capacitor through said second switch across at least a portion of said winding of said second reactor, said discharge circuits being effective upon closure of their respective said switch to substantially completely discharge their respective said commutating capacitor, means connecting said first energy circuit across at least a portion of said winding of said first reactor, and means connecting said second energy circuit across at least a portion of said winding of said second reactor.

9. The combination of claim 8 in which said discharge circuits are effective upon closure of their respective said switches to substantially completely discharge their respective said commutating capacitor and to charge the other of the said commutating capacitors to substantially the potential supplied to the inverter.

10. The combination of claim 8 in which said energy circuits are polarized to conduct in a direction toward said input terminals.

11. The combination of claim 10 in which said capacitors are connected in series between first corresponding terminals of said windings, said switches are connected between second corresponding terminals of said windings, said means which connects said series connected unidirectional devices includes all of both of said windings, and said first and second energy circuits are connected between said first and second terminals of said first and second windings respectively.

References Cited

UNITED STATES PATENTS

| 3,262,036 | 7/1966 | Clarke et al. | |
| 3,321,697 | 5/1967 | Etter | 321—45 |
| 3,340,453 | 9/1967 | Bradley et al. | 321—5 |

JOHN F. COUCH, *Primary Examiner.*

W. H. BEHA, *Assistant Examiner.*